United States Patent
Elgendy et al.

(10) Patent No.: US 11,763,423 B1
(45) Date of Patent: *Sep. 19, 2023

(54) LUMINANCE-GUIDED IMAGE DE-MOSAICING AND DE-NOISING

(71) Applicant: Gigajot Technology, Inc., Pasadena, CA (US)

(72) Inventors: Omar Elgendy, Monrovia, CA (US); Jiaju Ma, Monrovia, CA (US); Saleh Masoodian, Monrovia, CA (US); Stanley Chan, West Lafayette, IN (US)

(73) Assignee: Gigajot Technologies, Inc., Glendale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/715,871

(22) Filed: Apr. 7, 2022

Related U.S. Application Data

(63) Continuation of application No. 17/098,273, filed on Nov. 13, 2020, now Pat. No. 11,328,386.

(60) Provisional application No. 62/934,705, filed on Nov. 13, 2019.

(51) Int. Cl.
*G06T 3/40* (2006.01)
*G06T 5/00* (2006.01)
*G06T 5/50* (2006.01)
*G06N 3/08* (2023.01)

(52) U.S. Cl.
CPC ............. *G06T 3/4015* (2013.01); *G06N 3/08* (2013.01); *G06T 5/002* (2013.01); *G06T 5/50* (2013.01); *G06T 2207/20024* (2013.01); *G06T 2207/20081* (2013.01); *G06T 2207/20084* (2013.01); *G06T 2207/20224* (2013.01)

(58) Field of Classification Search
CPC ........ G06T 3/4015; G06T 5/002; G06T 5/50; G06T 2207/20024; G06T 2207/20081; G06T 2207/20084; G06T 2207/20224; G06N 3/08

See application file for complete search history.

(56) References Cited

U.S. PATENT DOCUMENTS

| | | | |
|---|---|---|---|
| 8,564,699 B2 | 10/2013 | Alleysson et al. | |
| 11,328,386 B1* | 5/2022 | Elgendy | ............ G06N 3/08 |
| 2020/0065942 A1 | 2/2020 | Hiasa | |
| 2020/0394772 A1 | 12/2020 | Afra | |

FOREIGN PATENT DOCUMENTS

CN          108492265 A        9/2018

* cited by examiner

*Primary Examiner* — Phuoc Tran
(74) *Attorney, Agent, or Firm* — Robert C. Kowert; Kowert, Hood, Munyon, Rankin & Goetzel, P.C.

(57) ABSTRACT

Chrominance data channels are reconstructed from a color-mosaic image data input and de-noised with guidance from a luminance data channel extracted from that same mosaic data input to produce de-noised chrominance channels. The de-noised chrominance channels are combined with a de-noised version of the luminance channel to yield a primary-color-channel output image.

22 Claims, 3 Drawing Sheets

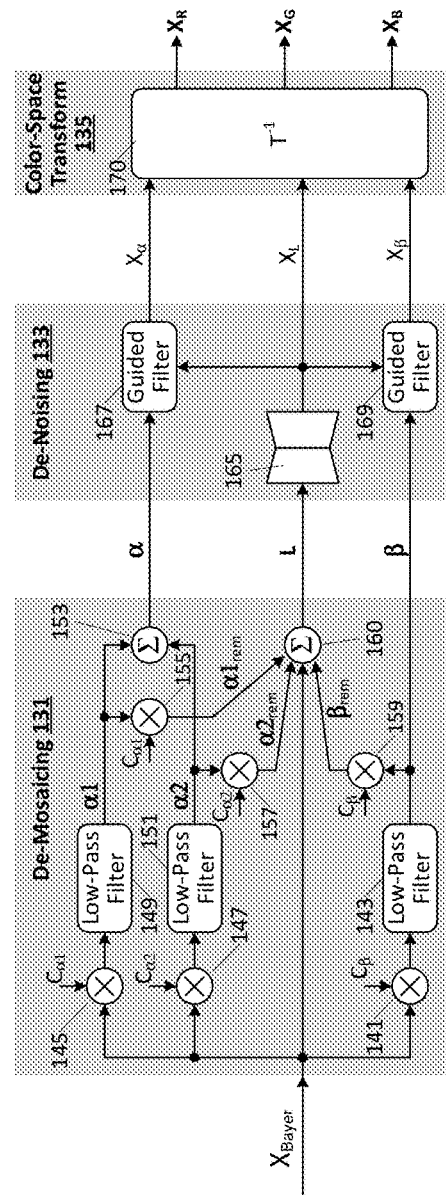
FIG. 1
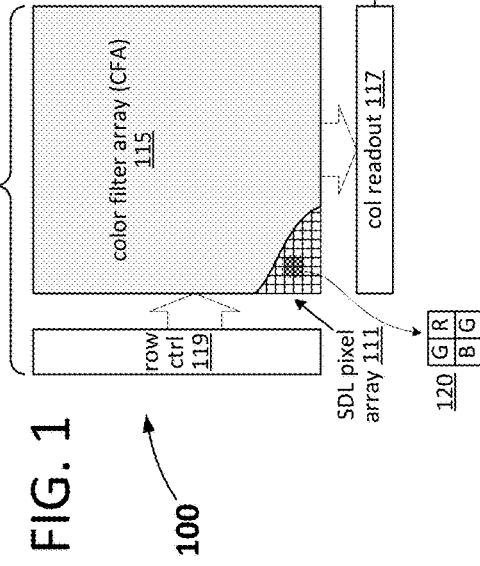
FIG. 2
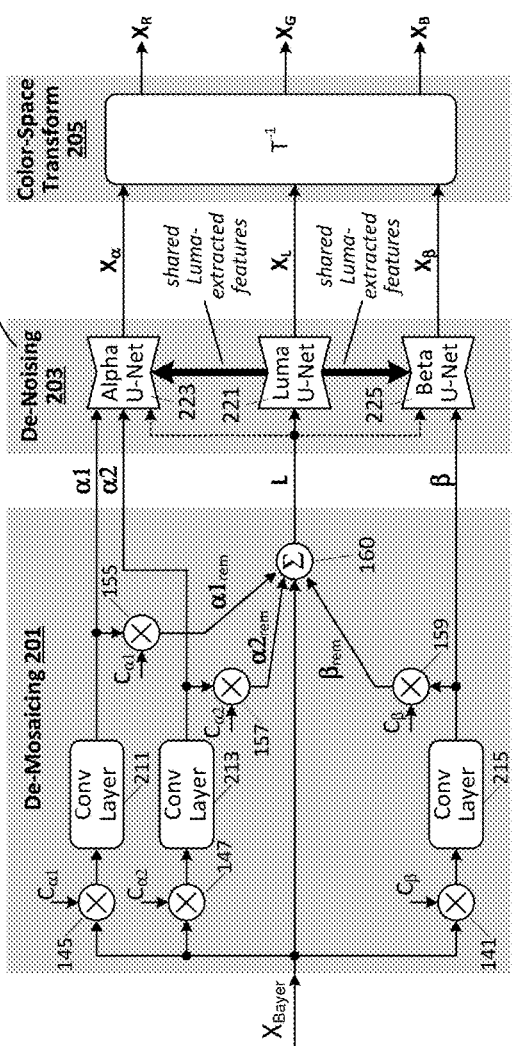

LUMINANCE-GUIDED IMAGE DE-MOSAICING AND DE-NOISING

CROSS-REFERENCE TO RELATED APPLICATIONS

This application is a continuation of U.S. patent application Ser. No. 17/098,273 filed Nov. 13, 2020 (U.S. Pat. No. 11,328,386), which claims the benefit of U.S. provisional application No. 62/934,705 filed Nov. 13, 2019. Each of the foregoing applications is hereby incorporated by reference.

TECHNICAL FIELD

The disclosure herein relates to low-light image generation.

INTRODUCTION

Low-light image de-mosaicing and de-noising solutions proposed to date suffer various drawbacks. Iterative solutions, for example, are generally too slow for QIS (quanta image sensor) and other high-frame rate applications, and other approaches yield unwanted artifacts and/or degraded resolution.

DRAWINGS

The various embodiments disclosed herein are illustrated by way of example, and not by way of limitation, in the figures of the accompanying drawings and in which like reference numerals refer to similar elements and in which:

FIG. 1 illustrates an embodiment of an imaging system having a pixel image sensor together with an image processing engine that implements non-iterative luminance-guided color-channel de-noising.

FIG. 2 illustrates a more detailed embodiment of an image processing engine having de-mosaicing, de-noising and transform stages (corresponding to those shown in FIG. 1);

Figure 3:
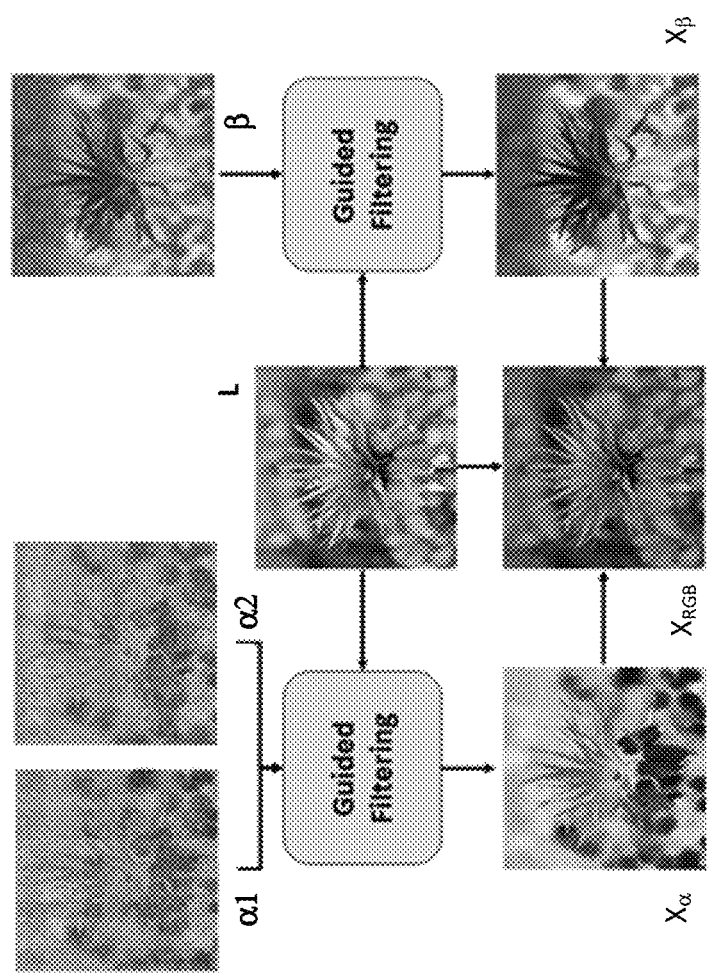
Figure 4:
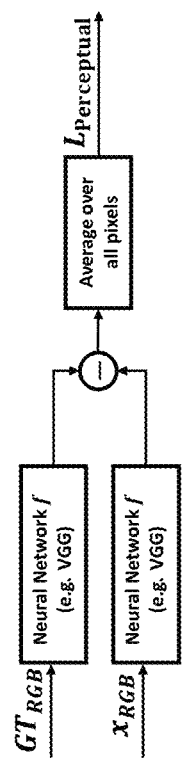
Figure 6:
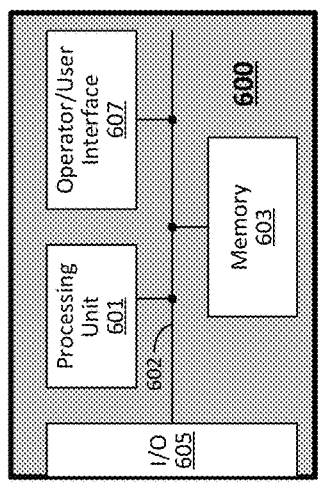
Figure 5:
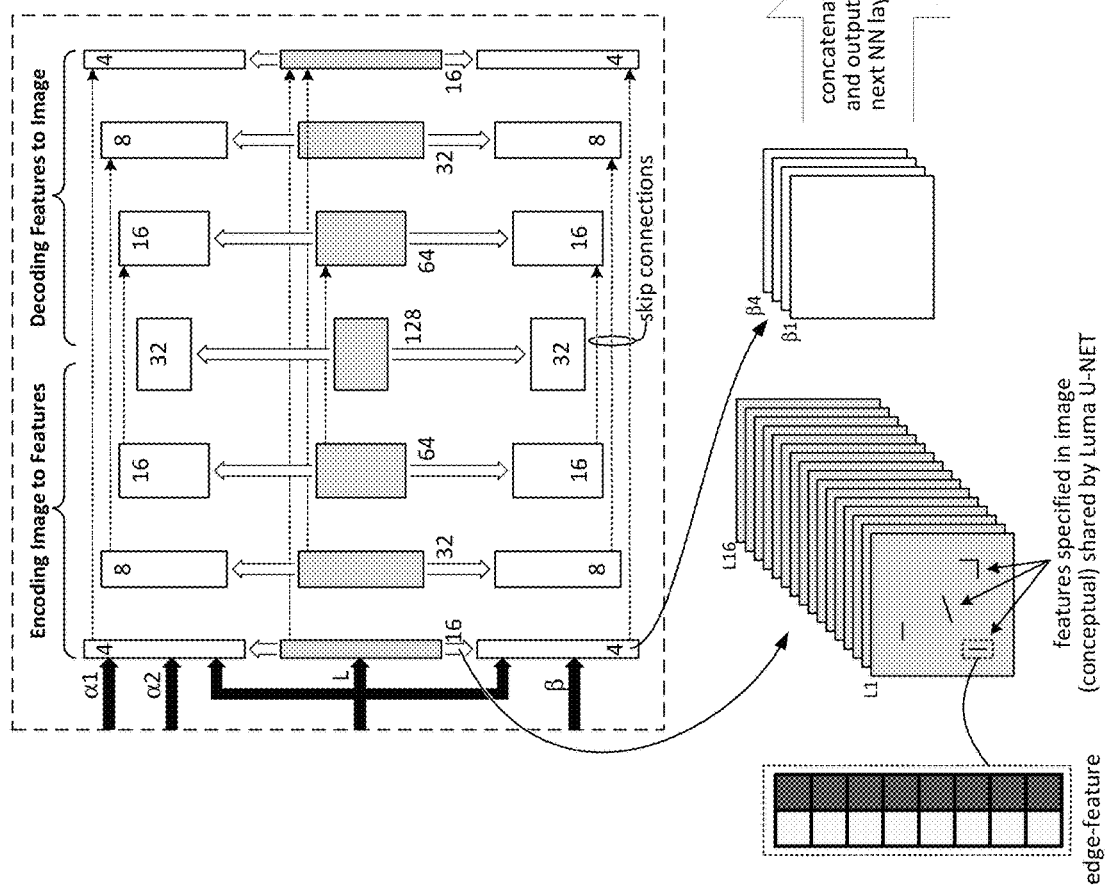

FIG. 3 presents an exemplary visual illustration of the FIG. 2 luminance/chrominance reconstruction;

FIG. 4 presents a conceptual implementation of a perceptual loss function that may be applied to train one or more of the neural networks shown in FIGS. 1 and 2;

FIG. 5 provides additional detail regarding guided de-noising of chrominance channels using the de-noised luminance channel within an exemplary U-Net neural-network architecture; and FIG. 6 illustrates a generalized embodiment of a computing element, system or device that may be used to implement any or all stages of the image processing engines described in reference to FIGS. 1 and 2.

DETAILED DESCRIPTION

In various embodiments herein, chrominance and luminance data channels are reconstructed from a color-mosaic image data input then the luminance channel is de-noised and used to guide the chrominance channels de-noising process. The de-noised chrominance channels are then combined with the de-noised version of the luminance channel to yield a primary-color-channel output image. In a number of embodiments, the color-mosaic image data input is produced by an integrated-circuit sensor having a small-pitch array of sub-diffraction-limit (SDL) pixels overlaid by a color filter array (e.g., Bayer- or other-pattern color filter array)—an arrangement that yields mosaic input data in which aliasing or interference between the luminance and chrominance channel in the frequency domain tend to be minimal (the SDL pixels effecting a natural anti-aliasing filter) so that the chrominance channels can be extracted, for example, using simple multiplication (modulation) with a predefined carrier image followed by low-pass filtering. For Bayer color filter array, a luminance channel $L=(R+2G+B)/4$, and two chrominance channels $\alpha=(B-R)/4$ and $\beta=(R-2G+B)/4$ may be reconstructed where R, G and B are the three primary color channels. After reconstructing the chrominance channels from the mosaic input, for example, by modulating the mosaic input with predefined carrier images and then low-pass filtering, the chrominance channels are re-modulated with those same carrier images and then subtracted from the mosaic input to yield a luminance channel which, in turn, is denoised (e.g., by a neural network), and then applied to guide filtering/de-noising of the chrominance channels. The luminance and chrominance channels may then be supplied to downstream circuitry and/or optionally transformed into an alternative color space—for example, subject to linear transformation into RGB (red, green, blue) color space.

FIG. 1 illustrates an embodiment of an imaging system 100 having a pixel image sensor 101 together with an image processing engine 103 that implements non-iterative luminance-guided color-channel de-noising. In the example shown, image sensor 101 and image processing engine 103 are implemented within separate, but interconnected system components—for example, on separate integrated circuit chips (that may be coupled to one another within a common integrated circuit package such as a system in package, three-dimensional IC or the like) or within separate integrated-circuit packages disposed within a host device or appliance. In other embodiments, the image processing engine may be physically de-coupled from the image sensor as in a data processing unit that receives the output of the image sensor via a communication network or portable media. Conversely, where die area permits, the image processing engine and image sensor may be co-located within the same integrated circuit die.

In the FIG. 1 embodiment, image sensor 101 is implemented by an array of sub-diffraction-limit (SDL) pixels 111 (i.e., individual pixels substantially smaller than the Airy Disk focal point of a perfect lens for frequencies higher than a given value) overlaid by a color filter array 115 to yield a mosaic pixel data readout (via column-readout circuit 117 and in response to control signals from row controller 119)—that is, a frame of digital pixel values in which each individual value represents luminance (of a respective point in an objective scene detected by a respective set of one or more SDL pixels) within a spectral range corresponding to the color filter element for that set of one or more SDL pixels. In the case of a Bayer-pattern color filter array, for example, image sensor 101 outputs a mosaic frame of red, green and blue pixel values, "$X_{Bayer}$," in which every four pixel values includes a pair of green pixel values together with one red pixel value and one blue pixel value corresponding to the minimal 2×2 SDL pixel group shown at 120. In alternative embodiments, each green, blue and red color filter element may overlay multiple SDL pixels (e.g., a 2×2 set of SDL pixels, 4×4 set of SDL pixels, etc.). More generally, while Bayer-pattern color filtering is shown in FIG. 1 and assumed in embodiments discussed below, various alternative color filter arrays may be deployed in all cases, including color filter arrays having color elements other than red, green and blue (e.g., cyan, emerald, yellow, white, etc.).

Still referring to FIG. 1, image processing engine 103 includes a de-mosaicing stage 131, de-noising stage 133 and transform stage 135. de-mosaicing stage 131 receives the mosaic image data frame—the "input data"—directly or indirectly from image sensor 101 and performs modulation followed by low-pass filtering to produce three color data channels: α1, α2 and β. More specifically, the raw Bayer-format input image ($X_{Bayer}$) is multiplied by a predefined image $C_β$ at 141 and convolved with a low-pass filter 143 to generate the β color channel. Similarly, the raw input is multiplied by predefined images $C_{α1}$ and $C_{α2}$ (145, 147), respectively, and convolved with low-pass filters 149 and 151 to generate two independent versions of the α color channel, α1 and α2. These two a-channel versions are summed at 153 to generate a robust estimate of the α color channel. A luminance channel (L) is generated by re-modulating the α1, α2 and β color channels (multiplying those color channels by predefined images $C_{α1}$, $C_{α2}$ and $C_β$, respectively, at 155, 157 and 159) and then subtracting the re-modulated color channels from the raw input at 160. As shown, the two color channels (α and β) and luminance channel (L) constitute the de-mosaicing outputs to the de-noising stage.

Within de-noising stage 133, the luminance data channel (L) is supplied to a convolutional neural network 165 (e.g., U-Net or any other of various neural networks) to generate a noise-suppressed (de-noised) luminance output, $X_L$. The two chrominance channels (α, β) are de-noised—producing output channels $X_α$ and $X_β$—using an edge-based joint de-noising scheme such as (but not limited to) guided filtering, joint bilateral filtering or neural network guided denoising. In one embodiment, for instance, the de-noised luminance channel is applied as a guidance map (within respective guided filters 167, 169) for identifying edges within the α and β chrominance channels. A finalized output image having three primary color channel constituents (red, green and blue color channels $X_R$, $X_G$, $X_B$ in this example) is produced by applying a linear transform 170 to luminance channel $X_L$ and chrominance channels $X_α$, $X_β$.

FIG. 2 illustrates a more detailed embodiment of an image processing engine 200 having de-mosaicing, de-noising and transform stages (201, 203, 205) corresponding to those shown in FIG. 1. In the depicted example, low-pass filtering within de-mosaicing stage 201 is implemented for each of the three chrominance channels (α1, α2 and β) with a single, respective convolutional neural network layer 211, 213, 215 ("cony layer") or a weighted average of multiple cony layers. Individual channel modulation, remodulation and luminance channel generation is implemented as in FIG. 1 (i.e., modulation with redefined images at 141, 145, 147, post-filter remodulation with those predefined images at 159, 155 and 157, and luminance channel generation at 160). As in FIG. 1, chrominance channel de-noising is guided by luminance de-noising, in this case sharing de-noising features (such as edges, corners, and textures) extracted from the luminance de-noising network 221 with the chrominance denoising networks 223, 225 to guide the chrominance denoising process. Feature sharing can be achieved, for example, as shown in detail view 230—using smaller Alpha and Beta U-Nets for chrominance denoising and concatenating feature channels from the luminance U-Nets with their corresponding features in the chrominance U-Nets. In this detail view, the convolutional blocks and the non-linear activation functions are omitted for ease of understanding (showing only the feature maps at each phase). In the example shown, the luminance channel U-Net 221 receives the unfiltered luminance channel (L) from de-mosaicing engine 201, while alpha U-Net 223 receives chrominance channels a1 and a2 along with the unfiltered luminance channel L (and the extracted-feature information from the luminance U-Net 221), and beta U-Net 225 similarly receives chrominance channel b along with the unfiltered luminance channel and extracted-feature information from U-Net 221. FIG. 3 presents an exemplary visual illustration of the FIG. 2 luminance/chrominance reconstruction. In this embodiment, unlike FIG. 1, the two chrominance channels α1, α2 are fed to the Alpha U-Net to be combined therein, and the noisy luminance channel is fed to the Alpha and Beta U-Nets.

An end-to-end training for the neural networks in FIGS. 1 and 2 may be performed by minimizing one or a linear combination of loss functions including, for example and without limitation, luminance loss, chrominance loss and/or red-green-blue (RGB) loss. Luminance loss function maybe calculated as the mean squared difference or mean absolute difference by subtracting the de-noised luminance image $X_L$ and a corresponding clean (ground-truth) luminance image $GT_L$ and obtaining the average squared difference over all pixels of the image, respectively as follows $$L_{Luma} = \sum_{i=1}^{N} (X_L(i) - GT_L(i))^2$$

or average absolute difference $$L_{luma} = \sum_{i=1}^{N} |X_L(i) - GT_L(i)|$$

where i is the pixel index and N is the total number of pixels in the image. Similarity, the chrominance loss and RGB loss maybe calculated as the mean-squared difference between the de-noised images $X_α$, $X_β$, and $X_{RGB}$, and their corresponding ground truth images $GT_α$, $GT_β$, and $GT_{RGB}$ as follows:

$$L_{Alpha} = \sum_{i=1}^{N} (X_α(i) - GT_{Beta}(i))^2, L_β = \sum_{i=1}^{N} (X_B(i) - GT_B(i))^2, \text{ and}$$

$$L_{RGB} = \sum_{i=1}^{N} (X_R(i) - GT_R(i))^2 + \sum_{i=1}^{N} (X_G(i) - GT_G(i))^2 + \sum_{i=1}^{N} (X_B(i) - GT_B(i))^2.$$

Perceptual loss may be used for the RGB final image by computing the mean square error between perceptual features (such as edges, corners and textures) extracted from the processed RGB image and the ground truth RGB image using a pre-defined neural network such as VGG neural network which is represented by the mapping f as follows $$L_{Perceptual} = \sum_{i=1}^{N} (f(X_{RGB}(i)) - f(GT_{RGB}(i)))^2.$$

A conceptual implementation of the perceptual loss function is illustrated for example and without limitation in FIG. 4. The training process aims at estimating the neural networks' parameters (represented by θ) that minimize a linear combination of the luminance, chrominance and RGB loss functions over a training image dataset that comprises multiple pairs of noisy and clean (ground truth) images. Mathematically, this can be written as $$\theta = \operatorname*{argmin}_{\theta} c_1 L_{luma} + c_2 L_{Alpha} + c_3 L_{Beta} + c_4 L_{RGB} + c_5 L_{Perceptual}$$

where $c_1$, $c_2$, $c_3$, $c_4$ and $c_5$ are non-negative scalars. Optimization might be performed using any iterative optimization technique such as (but not limited to) stochastic gradient descent where the network parameters are randomly initialized before running the first iteration, and then updated at every iteration of the optimization algorithm until the linear combination of loss function converges to a local minimum value.

FIG. 5 expounds on detail view 230 of FIG. 2, illustrating the guided de-noising of chrominance channels using the de-noised luminance channel using the U-Net neural-network architecture as an example. As in detail view 230 of FIG. 2, the convolutional blocks and the non-linear activation functions of the neural networks are not specifically shown (showing instead only the feature maps at each phase). In this network architecture, a number of feature channels (16 in the luminance U-Net and 4 in the chrominance U-Net) are extracted from the input image at the full resolution (resolution is depicted as the feature rectangle height and number of feature channels is depicted numerically and visually by the feature rectangle width) using a combination of convolutional layers and non-linear activation functions. In each progression, twice the number of features is extracted at half resolution of the previous phase. This process of encoding the input image into features is repeated until the network reaches a predefined resolution (e.g., 128 feature channels in the luminance U-Net, 32 feature channels in the luminance U-Net). After reaching this resolution, the process is reversed where the features are decoded by a combination of convolutional blocks and non-linear activation functions so that each phase decodes the input features into output features having twice resolution and half number of features until the full resolution of the input image is reached. In this encoder-decoder U-Net architecture, skip connections are used to connect the encoder feature to their corresponding decoder features at the same resolution to maintain edges and fine-scale details.

In the encoder-decoder U-Net architecture of FIGS. 2 and 5, guided denoising is performed by sharing the encoder features of the luminance U-Net with their corresponding encoder features at the same resolutions in the chrominance U-Net. This sharing may be performed (but not limited to) by concatenating the luminance features to the chrominance features or adding the luminance features to the chrominance features. Luminance features comprise stronger information on edges, corners and textures compared to the chrominance features. Therefore, concatenating luminance features with the chrominance features enables the chrominance U-Net to learn better network parameters (through the training process) that improve the overall chrominance denoising performance. FIG. 6 illustrates a generalized embodiment of a computing element, system or device 600 that may be used to implement any or all stages of the image processing engines described in reference to FIGS. 1 and 2. As shown, computing element 600 includes a processing unit 601 formed by one or more general purposes or special-purpose processors (e.g., digital signal processor having a multiply-accumulate function for rapid convolutional operation), memory 603 for storing program code executed by the processing unit to implement the various processing stages (de-mosaicing, de-noising and/or transform) of the above-described embodiments, and also to store the data streamed through the computing element (i.e., input and output image data streams or portions thereof, intermediate chrominance/luminance data channels, etc.).

Computing element 600 further includes one or more input and/or output (I/O) ports 605 for receiving raw image data input and outputting processed image data, and a user interface 607 to present and receive information to a human or artificial operator (e.g., another computing device within a host system) and thus enable operator control of system operation (e.g., set configuration, programmable values, etc.) as well as to interact with the larger host system in a manner intended by its core function (e.g., image rendering system). Note that the user interface may alternatively be implemented through one or more of I/O ports 605. Also, numerous other functional blocks (not specifically shown) may be provided within computing element 600 according to its core function (and the computing system itself may be a component in a larger host device, appliance or network of devices/appliances). For example, when implemented within a smart phone, personal computing device, image display appliance, etc., computing element 600 may be accompanied by or incorporate wireless (radio-frequency) communication circuitry, image rendering display and various transducers (e.g., microphones, speakers, sensors, etc.).

Still referring to FIG. 4, the functional blocks within computing element 600 are coupled to one another via communication path 602 which, though conceptually depicted as a single shared bus, may include any number of shared or dedicated buses or signaling links (including wireless links) to convey information according to various proprietary or standardized protocols. More generally, the functional blocks shown may be interconnected in a variety of different topologies and individually be implemented by a variety of different underlying technologies and architectures. With regard to the memory architecture, for example, multiple different classes of storage may be provided within memory 603 to store different classes of data. For example, non-volatile storage media such as fixed or removable magnetic, optical, or semiconductor-based media may be provided to store executable code and related data (or receivable within such system to enable receipt of such executable code and related data), while volatile storage media such as static or dynamic RAM is provided to run-time variable data.

The various image processing methods and techniques disclosed herein may be implemented through execution of one or more a sequences of instructions (i.e., software program(s)) within the processing unit 601, by dedicated hardware (e.g., implemented within an application-specific integrated circuit (ASIC), or programmed on a programmable hardware device such as an FPGA (field-programmable gate array)), or by any combination programmed processor(s) and dedicated hardware. If a purely hardware-based execution engine is provided, the processing unit 601 and related circuitry may be omitted from computing element 600.

Any of the various methodologies disclosed herein and/or user interfaces for configuring and managing same may be implemented by machine execution of one or more sequences instructions (including related data necessary for proper instruction execution). Such instructions may be recorded on one or more computer-readable media for later retrieval and execution within one or more processors of a special-purpose or general-purpose computing system or consumer electronic device or appliance, such as the computing element, system, device or appliance described in reference to FIG. 4.

The various image sensor and image processing embodiments, operating methodology, implementing circuitry, etc. disclosed herein may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit, layout, and architectural expressions may be implemented include, but are not limited to, formats supporting behavioral languages such as C, Verilog, and VHDL, formats supporting register level description languages like RTL, and formats supporting geometry description languages such as GDSII, GDSIII, GDSIV, CIF, MEBES and any other suitable formats and languages. Computer-readable media in which such formatted data and/or instructions may be embodied include, but are not limited to, computer storage media in various forms (e.g., optical, magnetic or semiconductor storage media, whether independently distributed in that manner, or stored "in situ" in an operating system).

When received within a computer system via one or more computer-readable media, such data and/or instruction-based expressions of the above described circuits and device architectures can be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image can thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the disclosed embodiments. In some instances, the terminology and symbols may imply details not required to practice those embodiments. For example, any of the specific filter sizes, filter progressions, predefined images, pixel sizes, color filter arrays, and so forth can be different from those described above in alternative embodiments. Signal paths depicted or described as individual signal lines may instead be implemented by multi-conductor signal buses and vice-versa and may include multiple conductors per conveyed signal (e.g., differential or pseudo-differential signaling). The term "coupled" is used herein to express a direct connection as well as a connection through one or more intervening functional components or structures. Programming of operational parameters (predefined images applied within de-mosaicing engine, initial filter coefficients, etc.) or any other configurable parameters may be achieved, for example and without limitation, by loading a control value into a register or other storage circuit within the above-described processing engine and/or image sensor in response to a host instruction (and thus controlling an operational aspect of the device and/or establishing a device configuration) or through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The terms "exemplary" and "embodiment" are used to express an example, not a preference or requirement. Also, the terms "may" and "can" are used interchangeably to denote optional (permissible) subject matter. The absence of either term should not be construed as meaning that a given feature or technique is required.

Various modifications and changes can be made to the embodiments presented herein without departing from the broader spirit and scope of the disclosure. For example, features or aspects of any of the embodiments can be applied in combination with any other of the embodiments or in place of counterpart features or aspects thereof. Accordingly, the specification and drawings are to be regarded in an illustrative rather than a restrictive sense.

What is claimed is:

1. A method of operation within an image processing apparatus, the method comprising:
   receiving an input data frame constituted by pixel values corresponding to spatially-distributed color filter elements;
   generating a first luminance data frame and a first chrominance data frame corresponding to the input data frame;
   convolving the luminance data frame within a first convolutional neural network to generate (i) information indicative of chromatic edges within the input data frame and (ii) a noise-reduced luminance data frame; and
   filtering noise from the first chrominance data frame based at least in part on the information indicative of chromatic edges generated by the first convolutional neural network to produce a first noise-reduced chrominance data frame.

2. The method of claim 1 wherein generating the first chrominance data frame corresponding to the input data frame comprises modulating the input data frame with a first image to produce a first modulated data frame and low-pass filtering the first modulated data frame to generate the first chrominance data frame.

3. The method of claim 1 wherein generating the first luminance data frame corresponding to the input data frame comprises generating one or more modulated instances of the first chrominance data frame and combining the one or more modulated instances of the first chrominance data frame with the input data frame to generate the first luminance data frame.

4. The method of claim 3 wherein combining the one or more modulated instances of the first chrominance data frame with the input data frame to generate the first luminance data frame comprises subtracting the one or more modulated instances of the first chrominance data frame from the input data frame to generate the first luminance data frame.

5. The method of claim 3 wherein generating the one or more modulated instances of the first chrominance data frame comprises modulating the first chrominance data frame with a first image to generate a first modulated instance of the first chrominance data frame.

6. The method of claim 1 further comprising:
   generating a second chrominance data frame;
   filtering noise from the second chrominance data frame based at least in part on the information indicative of chromatic edges generated by the first convolutional neural network to produce a second noise-reduced chrominance data frame; and
   combining the noise-reduced luminance data frame with the first and second noise-reduced chrominance data frames to produce a red-green-blue (RGB) output data frame.

7. The method of claim 6 wherein combining the noise-reduced luminance data frame with the first and second noise-reduced chrominance data frames to produce the red-green-blue (RGB) output data frame comprises combining the noise-reduced luminance data frame with the first and second noise-reduced chrominance data frames in a linear transform.

8. The method of claim 1 wherein filtering noise from the first chrominance data frame based at least in part on the information indicative of chromatic edges comprises filtering noise within at least one of a bilateral filter, a linear filter, or a second neural network.

9. The method of claim 1 wherein convolving the luminance data frame within a first convolutional neural network comprises convolving the luminance data frame within a neural network having a plurality of neural network layers that include one or more convolutional layers and one or more transposed convolutional layers.

10. The method of claim 9 further comprising training the plurality of neural network layers by iteratively adjusting convolutional coefficients within the neural network layers to minimize a loss function.

11. An image processing apparatus comprising:
a de-mosaicing circuitry to:
receive an input data frame constituted by pixel values corresponding to spatially-distributed color filter elements; and
generate a first luminance data frame and a first chrominance data frame corresponding to the input data frame; and
a noise-reduction circuitry to:
convolve the luminance data frame within a first convolutional neural network to generate (i) information indicative of chromatic edges within the input data frame and (ii) a noise-reduced luminance data frame; and
filter noise from the first chrominance data frame based at least in part on the information indicative of chromatic edges generated by the first convolutional neural network to produce a first noise-reduced chrominance data frame.

12. The image processing apparatus of claim 11 wherein the de-mosaicing circuitry to generate the first chrominance data frame corresponding to the input data frame comprises circuitry to (i) modulate the input data frame with a first image to produce a first modulated data frame and (ii) low-pass filter the first modulated data frame.

13. The image processing apparatus of claim 11 wherein the de-mosaicing circuitry to generate the first luminance data frame corresponding to the input data frame comprises circuitry to generate one or more modulated instances of the first chrominance data frame and combine the one or more modulated instances of the first chrominance data frame with the input data frame.

14. The image processing apparatus of claim 13 wherein the circuitry to combine the one or more modulated instances of the first chrominance data frame with the input data frame comprises circuitry to subtract the one or more modulated instances of the first chrominance data frame from the input data frame.

15. The image processing apparatus of claim 13 wherein the circuitry to generate the one or more modulated instances of the first chrominance data frame comprises circuitry to modulate the first chrominance data frame with a first image to generate a first modulated instance of the first chrominance data frame.

16. The imaging apparatus of claim 11 wherein the de-mosaicing circuitry comprises circuitry to generate a second chrominance data frame and the noise-reduction circuitry comprises circuitry to filter noise from the second chrominance data frame based at least in part on the information indicative of chromatic edges generated by the first convolutional neural network to produce a second noise-reduced chrominance data frame, the image processing apparatus further comprising circuitry to combine the noise-reduced luminance data frame with the first and second noise-reduced chrominance data frames to produce a red-green-blue (RGB) output data frame.

17. The imaging apparatus of claim 16 wherein the circuitry to combine the noise-reduced luminance data frame with the first and second noise-reduced chrominance data frames to produce the red-green-blue (RGB) output data frame comprises circuitry to combine the noise-reduced luminance data frame with the first and second noise-reduced chrominance data frames in a linear transform.

18. The image processing apparatus of claim 11 wherein the noise-reduction circuitry to filter noise from the first chrominance data frame based at least in part on the information indicative of chromatic edges comprises at least one of a bilateral filter, a linear filter, or a second neural network.

19. The image processing apparatus of claim 11 wherein the first convolutional neural network comprises a plurality of neural network layers that include one or more convolutional layers and one or more transposed convolutional layers.

20. The image processing apparatus of claim 19 further comprising circuitry to train the plurality of neural network layers by iteratively adjusting convolutional coefficients within the neural network layers to minimize a loss function.

21. The image processing apparatus of claim 11 wherein at least one of the de-mosaicing circuitry and the noise-reduction circuitry is implemented, at least in part, by a programmed processor.

22. An image processing apparatus comprising:
means for:
receiving an input data frame constituted by pixel values corresponding to spatially-distributed color filter elements; and
generating a first luminance data frame and a first chrominance data frame corresponding to the input data frame; and
means for:
convolving the luminance data frame within a first convolutional neural network to generate (i) information indicative of chromatic edges within the input data frame and (ii) a noise-reduced luminance data frame; and
filtering noise from the first chrominance data frame based at least in part on the information indicative of chromatic edges generated by the first convolutional neural network to produce a first noise-reduced chrominance data frame.

* * * * *